US012565004B2

(12) United States Patent (10) Patent No.: US 12,565,004 B2
Crabtree et al. (45) Date of Patent: Mar. 3, 2026

(54) ADDITIVE MANUFACTURING

(71) Applicant: ADDITIVE MANUFACTURING TECHNOLOGIES LIMITED, Sheffield (GB)

(72) Inventors: Joseph Gwilliam Crabtree, Sheffield (GB); Konstantin Rybalcenko, Sheffield (GB); Andre Gaio, Sheffield (GB)

(73) Assignee: ADDITIVE MANUFACTURING TECHNOLOGIES LIMITED, Sheffield (GB)

( * ) Notice: Subject to any disclaimer, the term of this patent is extended or adjusted under 35 U.S.C. 154(b) by 885 days.

(21) Appl. No.: 17/282,713

(22) PCT Filed: Oct. 4, 2019

(86) PCT No.: PCT/GB2019/052815
§ 371 (c)(1),
(2) Date: Apr. 2, 2021

(87) PCT Pub. No.: WO2020/070518
PCT Pub. Date: Apr. 9, 2020

(65) Prior Publication Data
US 2021/0387415 A1 Dec. 16, 2021

(30) Foreign Application Priority Data
Oct. 5, 2018 (GB) ...................................... 1816261

(51) Int. Cl.
B29C 64/35 (2017.01)
B29C 64/379 (2017.01)
(Continued)

(52) U.S. Cl.
CPC ............ B29C 64/35 (2017.08); B29C 64/379 (2017.08); B29C 64/386 (2017.08); B29C 64/40 (2017.08);
(Continued)

(58) Field of Classification Search
CPC ............ B29C 64/35; B29C 2071/0027; B29C 64/153; B29C 64/205; B29C 64/30;
(Continued)

(56) References Cited

U.S. PATENT DOCUMENTS 9,283,716 B2 * 3/2016 Swanson ................. B29C 64/35
2008/0169585 A1 7/2008 Zinniel
(Continued)

FOREIGN PATENT DOCUMENTS

CN 101578169 A 11/2009
CN 107089009 A 8/2017
(Continued)

OTHER PUBLICATIONS

Office Action issued in corresponding CN Application No. 201980074232.2 with English translation dated Aug. 22, 2022 (30 pages).
(Continued)

*Primary Examiner* — Douglas Lee
(74) *Attorney, Agent, or Firm* — Osha Bergman Watanabe & Burton LLP

(57) ABSTRACT

The present invention relates to a system (100) for automatically processing an additively manufactured part. The system comprises an inspection module (120) for determining at least one part parameter associated with a surface finish quality of the part, a processing module (118) for processing a surface of the part responsive to the at least one part parameter and controller (102) configured to modify a processing parameter of a surface finishing process, per-
(Continued)

formed by the processing module, based on the at least one part parameter determined by the inspection module.

13 Claims, 2 Drawing Sheets

(51) Int. Cl.

| | |
|---|---|
| *B29C 64/386* | (2017.01) |
| *B29C 64/40* | (2017.01) |
| *B29C 71/00* | (2006.01) |
| *B33Y 30/00* | (2015.01) |
| *B33Y 40/00* | (2020.01) |
| *B33Y 40/20* | (2020.01) |
| *B33Y 50/00* | (2015.01) |

(52) U.S. Cl.
CPC .......... *B29C 71/0009* (2013.01); *B33Y 30/00* (2014.12); *B33Y 40/00* (2014.12); *B33Y 40/20* (2020.01); *B33Y 50/00* (2014.12); *B29C 2071/0027* (2013.01)

(58) Field of Classification Search
CPC ... B29C 64/357; B29C 64/379; B29C 64/386; B29C 64/40; B29C 71/0009; B33Y 30/00; B33Y 40/00; B33Y 10/00; B33Y 40/20; B33Y 50/00; B07B 1/40; B07B 9/00
See application file for complete search history.

(56) References Cited

U.S. PATENT DOCUMENTS

| | | | |
|---|---|---|---|
| 2013/0248491 A1 | 9/2013 | Swanson et al. | |
| 2014/0065194 A1 | 3/2014 | Yoo et al. | |
| 2016/0199911 A1* | 7/2016 | Dave ...................... | B22F 10/85 |
| | | | 419/53 |
| 2017/0239893 A1* | 8/2017 | Hoover ................. | B29C 64/393 |
| 2017/0348900 A1* | 12/2017 | Williams .............. | B29C 64/393 |
| 2017/0355146 A1* | 12/2017 | Buller .................... | B22F 10/38 |
| 2018/0133963 A1 | 5/2018 | Bechmann et al. | |
| 2018/0141119 A1* | 5/2018 | Shu ........................... | B22F 9/04 |
| 2018/0222115 A1* | 8/2018 | Watanabe ............. | B29C 64/241 |
| 2018/0304540 A1* | 10/2018 | Tobia ..................... | B22F 10/31 |

FOREIGN PATENT DOCUMENTS

| | | |
|---|---|---|
| DE | 102017202088 A1 | 8/2018 |
| EP | 1961514 A2 | 8/2008 |
| EP | 1501669 B1 | 12/2008 |
| EP | 3251844 A1 | 12/2017 |
| GB | 2560073 A | 8/2018 |
| GB | 2571804 A | 9/2019 |
| GB | 2572953 A | 10/2019 |
| WO | 0110631 A2 | 2/2001 |
| WO | 0110631 A3 | 5/2001 |
| WO | 2017/050860 A1 | 3/2017 |
| WO | 2018071428 A1 | 4/2018 |
| WO | 2018/127683 A1 | 7/2018 |
| WO | 2018160169 A1 | 9/2018 |

OTHER PUBLICATIONS

Office Action issued in corresponding EP Application No. 19787387.0 dated Jul. 27, 2022 (9 pages).

Griffiths Laura: "The MTC offers a flexible solution to 3D printing's postprocessing problem", tct magazine, Jul. 19, 2018 (Jul. 19, 2018), XP055945144, Retrieved from the Internet: <URL:https://www.tctmagazine.com/additive-manufacturing-3d-printingnews/flexifinish-3d-printing-post-processing/> [retrieved on Jul. 21, 2022] (8 pages).

Anonymous: "MTC Flexi Finish", youtube.com, Apr. 24, 2018 (Apr. 24, 2018), XP055945160, Retrieved from the Internet: <URL:https://www.youtube.com/watch?v=Yyk7eRisgKo> [retrieved on Jul. 21, 2022] (1 page).

Examination Report issued in corresponding GB Application No. 2011341.1 dated Aug. 24, 2020 (4 pages).

Examination Report issued in corresponding GB Application No. 1914397.3 dated Mar. 19, 2020 (7 pages).

Examination Report issued in corresponding GB Application No. 1914397.3 dated Jun. 18, 2020 (2 pages).

Examination Report issued in corresponding GB Application No. 2011341.1 dated Apr. 21, 2021 (2 pages).

International Search Report issued in International Application No. PCT/GB2019/052815 dated Dec. 20, 2019 (5 pages).

Written Opinion issued in International Application No. PCT/GB2019/052815 dated Dec. 20, 2019 (10 pages).

Third Party Observation for application No. EP20190787387 Successful submission of observation took place on Aug. 10, 2021 16:45 (3 pages).

Smith, Bethan et al. "Towards post-processing as a key process variable in the AM design chain" Joint Special Interest Group meeting between euspen and ASPE Dimensional Accuracy and Surface Finish in Additive Manufacturing, KU Leuven, BE, Oct. 2017 pp. 91-94 (6 pages).

Third Party Observation for application No. EP20190787387 Oct. 11, 2021 (3 pages).

Third Party Observation for application No. EP20190787387 Oct. 15, 2021 (4 pages).

Griffiths, Laura "The MTC offers a flexible solution to 3D printing's post-processing problem" Jul. 19, 2018 <https://www.tctmagazine.com/additive-manufacturing-3d-printing-news/flexifinish-3d-printing-post-processing/> (7 pages).

Office Action issued in GB Application No. GB1816261.0 mailed on Jul. 30, 2019 (3 pages).

International Search Report issued in Application No. 24219072.6, mailed on Jun. 6, 2025 (10 pages).

* cited by examiner

ADDITIVE MANUFACTURING

The present invention relates to additive manufacturing and in particular, but not exclusively, to automated post-processing of an additively manufactured polymer part.

Additive manufacturing (AM) is a process during which an object can be manufactured from a digital file using a layer-by-layer method without using a mould. Objects manufactured by this method usually require post-processing, including smoothing and colouring. This is particularly the case for AM polymer parts, which are generally used for aesthetic purposes. However, post-processing and inspection of AM parts is manually intensive and therefore currently accounts for the majority of the cost and time of conventional AM processes. This poses a barrier to the mass adoption of industrial AM and prevents it from competing with traditional centralised manufacturing industries.

It is therefore an aim of certain embodiments of the present invention to provide a system and method for fully automating the AM process from initial part design to inspection of a post-processed AM part.

It is an aim of certain embodiments of the present invention to provide a modular end-to-end automated post-processing manufacturing system and method for fully automating the AM process which can be applied to many consumer and high value businesses creating flexibility and allowing the full exploitation of AM.

It is an aim of certain embodiments of the present invention to provide a system and method for fully automating the AM process which is customisable to provide flexibility to a user in terms of post-processing and inspection of AM parts.

According to a first aspect of the present invention there is provided a system for automatically processing an additively manufactured part comprising:

a support removal module for removing support material from an additively manufactured part;

an inspection module for determining at least one part parameter associated with a surface finish of the part;

a processing module for processing a surface of the part responsive to the at least one part parameter; and at least one conveyor for locating the part in the support removal module and moving the part between the modules.

Advantageously, the system of the first aspect of the invention is able to provide a fully automated AM process, thereby improving system throughput.

Optionally, the system may comprise a controller configured to modify a processing parameter of a surface finishing process, performed by the processing module, based on the at least one part parameter determined by the inspection module.

Advantageously, since the system is able to automatically analyse and accordingly process AM parts, the overall burden placed on the system operator can be drastically reduced and hence product throughput and quality can be improved as a result. This also enables the system to automatically generate lots of unique sets of post-processing information about each AM part. Furthermore the system is highly controllable and customisable in terms of handling and applied post-processing steps and is therefore easier to adapt to various types of AM part.

Optionally, the at least one conveyor is configured to move the part from an additive manufacturing apparatus to the support removal module.

Advantageously, this reduces the burden placed on an operator when post-processing a part, thereby helping to improve the throughput of the system.

Optionally, the support removal apparatus comprises at least one de-powdering module to remove unprocessed support powder surrounding the part.

Optionally, the at least one de-powdering module comprises a plurality of de-powdering modules each configured for removing a different grade of powder from the part.

Optionally, the inspection module may be an optical inspection module.

Optionally, the inspection module may be a non-contact optical inspection module.

Advantageously, this helps to reduce the likelihood of the inspection module causing damage to the AM part during inspection.

Optionally, the de-powdering module comprises a fluidising bed reactor.

Advantageously, this feature enables courser powders to be removed efficiently.

Optionally, the de-powdering module is configured to impart ultrasonic waves in a water-surfactant solution.

Advantageously, the feature enables the removal of finer powders from the AM part.

Optionally, the system comprises at least one support collection module for collecting support material removed from the part.

Advantageously, this helps to reduce wastage when using the system.

Optionally, the support collection module comprises at least one powder recovery module for recovering unprocessed powder removed from the part.

Advantageously, this enables recycling of powder from the system, thereby further reducing wastage.

Optionally, the inspection module is configured to optically determine a surface texture and/or roughness of the part.

Optionally, the at least one conveyor comprises at least one conveyor belt for transporting the part from the support removal module to the processing module.

Advantageously, the conveyor belt provides a stable platform to enable processes to be performed whilst the part is being moved, thereby improving throughput of the system.

Optionally, the inspection module is configured to determine the at least one part parameter associated with a surface finish of the part whilst the part is being transported on the at least one conveyor.

Advantageously, this removes the need for separate measuring and conveyance steps to be performed by the system, and hence overall throughput can be further improved.

Optionally, the at least one conveyor comprises at least one robotic arm.

Advantageously, this enables AM parts to be directly placed within each of the respective modules, which helps to further improve system throughput and also provides a space-saving benefit since the need for intricate conveyance paths between modules can be avoided.

Optionally, the at least one robotic arm comprises a robotic arm configured to locate the part on a support of the processing module.

Optionally, the or a further robotic arm is configured to load and unload the support into and from the processing module.

Optionally, the processing module is configured to smooth a surface of the part responsive to the at least one part parameter associated with a surface finish of the part.

Advantageously, this enables parts processed by the system to exhibit skin-touch friendly and low friction characteristics.

Optionally, the processing module comprises:

a reservoir for containing a liquid solvent; and a processing chamber in controllable fluid communication with the reservoir.

Optionally, the processing module comprises a solvent delivery system configured to receive a predetermined amount of solvent from the reservoir and introduce the same into the processing chamber.

Advantageously, this enables AM parts with intricate geometries to be more easily processed.

Optionally, the solvent delivery system is configured to controllably heat the solvent to a predetermined solvent temperature to cause the same to vaporise.

Optionally, the processing module is configured to colour a surface of the part.

Optionally, the system comprises at least one additive manufacturing apparatus.

Optionally, the support removal module may comprise a cooling chamber, and a sensor configured to monitor a temperature of the cooling chamber.

The controller may be configured to receive feedback from the sensor and produce an output for adjusting a print procedure of an additive manufacturing apparatus based on the feedback received from the sensor.

Advantageously, this helps to reduce cooling times, and hence system processing times, thereby further improving system throughput.

Optionally the controller may be configured to modify a support removal process parameter of a support removal process, performed by the support removal module, based on the at least one part parameter determined by the inspection module.

Advantageously, this helps to improve the efficiency of support removal and helps to optimise the post-processing steps to improve system throughput.

Optionally, the inspection module may be configured to analyse the at least one part parameter after the surface of the part has been processed by the processing module.

The controller may be configured to further modify the processing parameter of the surface finishing process, performed by the processing module, based on the at least one part parameter determined by the inspection module after the surface of the part has been processed by the processing module.

Alternatively, the controller may be configured to further modify a processing parameter of the surface finishing process, performed by the processing module, based on the at least one part parameter determined by the inspection module after the surface of the part has been processed by the processing module.

Advantageously, this helps to improve the surface finish quality of parts processed using the system.

Furthermore, since the system automatically adjusts the surface finishing processing parameters in response to a part falling below a desired surface finish quality, the amount of waste or "dud" parts produced using the system is also reduced.

Optionally, the controller may be configured to modify a processing parameter of a surface finishing process for processing a new part, based on the at least one part parameter determined by the inspection module.

Advantageously, this helps to efficiently ensure than any future parts manufactured by the system meet the required quality standards, without any further operator input being required.

According to a second aspect of the present invention, there is provided a system for automatically processing an additively manufactured part, comprising:

an inspection module for determining at least one part parameter associated with a surface finish quality of the part;

a processing module for processing a surface of the part responsive to the at least one part parameter; and a controller configured to modify a processing parameter of a surface finishing process, performed by the processing module, based on the at least one part parameter determined by the inspection module.

Advantageously, since the system is able to automatically analyse and accordingly process AM parts, the overall burden placed on the system operator can be drastically reduced and hence product throughput and quality can be improved as a result. This also enables the system to automatically generate lots of unique sets of post-processing information about each AM part. Furthermore the system is highly controllable and customisable in terms of handling and applied post-processing steps and is therefore easier to adapt to various types of AM part.

Optionally, the controller may be configured to modify a processing parameter of a surface finishing process for processing a new part, based on the at least one part parameter determined by the inspection module.

Advantageously, this helps to efficiently ensure that any future parts manufactured by the system meet the required quality standards, without any further operator input being required.

Optionally, the system may comprise a support removal module for removing support material from an additively manufactured part.

Advantageously, this helps to reduce the amount of processing that is required at the processing module.

Optionally, the inspection module may be an optical inspection module.

Optionally, the inspection module may be a non-contact optical inspection module.

Advantageously, this helps to reduce the likelihood of the inspection module causing damage to the AM part during inspection.

Optionally, the system may comprise at least one conveyor for locating the part in the processing module.

Optionally, the system may comprise at least one conveyor for locating the part in the support removal module and moving the part between the modules.

Advantageously, this helps to reduce the burden placed on an operator by automatically moving the part between modules, and also helps to improve process throughput.

Optionally, the at least one conveyor is configured to move the part from an additive manufacturing apparatus to the support removal module.

Advantageously, this reduces the burden placed on an operator when post-processing a part, thereby helping to improve the throughput of the system.

Optionally, the support removal apparatus comprises at least one de-powdering module to remove unprocessed support powder surrounding the part.

Optionally, the at least one de-powdering module comprises a plurality of de-powdering modules each configured for removing a different grade of powder from the part.

Optionally, the de-powdering module comprises a fluidising bed reactor.

Advantageously, this feature enables courser powders to be removed efficiently.

Optionally, the de-powdering module is configured to impart ultrasonic waves in a water-surfactant solution.

Advantageously, the feature enables the removal of finer powders from the AM part.

Optionally, the system comprises at least one support collection module for collecting support material removed from the part.

Advantageously, this helps to reduce wastage when using the system.

Optionally, the support collection module comprises at least one powder recovery module for recovering unprocessed powder removed from the part.

Advantageously, this enables recycling of powder from the system, thereby further reducing wastage.

Optionally, the inspection module is configured to optically determine a surface texture and/or roughness of the part.

Optionally, the at least one conveyor comprises at least one conveyor belt for transporting the part from the support removal module to the processing module.

Advantageously, the conveyor belt provides a stable platform to enable processes to be performed whilst the part is being moved, thereby improved throughput of the system.

Optionally, the inspection module is configured to determine the at least one part parameter associated with a surface finish of the part whilst the part is being transported on the at least one conveyor.

Advantageously, this removes the need for separate measuring and conveyance steps to be performed by the system, and hence overall throughput can be further improved.

Optionally, the at least one conveyor comprises at least one robotic arm.

Advantageously, this enables AM parts to be directly placed within each of the respective modules, which helps to further improve system throughput and also provides a space-saving benefit since the need for intricate conveyance paths between modules can be avoided.

Optionally, the at least one robotic arm comprises a robotic arm configured to locate the part on a support of the processing module.

Optionally, the or a further robotic arm is configured to load and unload the support into and from the processing module.

Optionally, the processing module is configured to smooth a surface of the part responsive to the at least one part parameter associated with a surface finish of the part.

Advantageously, this enables parts processed by the system to exhibit skin-touch friendly and low friction characteristics.

Optionally, the processing module comprises:
a reservoir for containing a liquid solvent; and
a processing chamber in controllable fluid communication with the reservoir.

Optionally, the processing module comprises a solvent delivery system configured to receive a predetermined amount of solvent from the reservoir and introduce the same into the processing chamber.

Advantageously, this enables AM parts with intricate geometries to be more easily processed.

Optionally, the solvent delivery system is configured to controllably heat the solvent to a predetermined solvent temperature to cause the same to vaporise.

Optionally, the processing module is configured to colour a surface of the part.

Optionally, the system comprises at least one additive manufacturing apparatus.

Optionally, the support removal module may comprise a cooling chamber, and a sensor configured to monitor a temperature of the cooling chamber.

The controller may be configured to receive feedback from the sensor and produce an output for adjusting a print procedure of an additive manufacturing apparatus based on the feedback received from the sensor.

Advantageously, this helps to reduce cooling times, and hence system processing times, thereby further improving system throughput.

Optionally the controller may be configured to modify a support removal process parameter of a support removal process, performed by the support removal module, based on the at least one part parameter determined by the inspection module.

Advantageously, this helps to improve the efficiency of support removal and optimise the post-processing steps to improve system throughput.

Optionally, the inspection module may be configured to analyse the at least one part parameter after the surface of the part has been processed by the processing module.

The controller may be configured to further modify the processing parameter of the surface finishing process, performed by the processing module, based on the at least one part parameter determined by the inspection module after the surface of the part has been processed by the processing module.

Alternatively, the controller may be configured to further modify a processing parameter of the surface finishing process, performed by the processing module, based on the at least one part parameter determined by the inspection module after the surface of the part has been processed by the processing module.

Advantageously, this helps to improve the surface finish quality of parts processed using the system.

Furthermore, since the system automatically adjusts the surface finishing process parameters in response to a part falling below a desired surface finish quality, the amount of waste or "dud" parts produced using the system is also reduced.

According to a third aspect of the present invention there is provided a method of automatically processing an additively manufactured part comprising:
by a conveyor, locating an additively manufactured part in a support removal module configured to remove support material from an additively manufactured part;
by the support removal module removing support material from the part;
by a conveyor, moving the part from the support removal module to an inspection module for determining at least one part parameter associated with a surface finish of the part;
by the inspection module, determining at least one part parameter associated with a surface finish of the part;
by a controller, modifying a processing parameter of a surface finishing process, performed by a processing module, based on the at least one part parameter determined by the inspection module;
by a conveyor, moving the part from the inspection module to the processing module for processing a surface of the part responsive to the at least one part parameter; and by the processing module, processing a surface of the part responsive to the at least one part parameter.

Advantageously, as with the first and second aspects of the present invention, since the system is able to automatically analyse and accordingly process AM parts, the overall burden placed on the system operator can be drastically reduced, and hence, product throughput can be drastically improved as a result.

Optionally, the method further comprises, by a conveyor, moving the part from an additive manufacturing apparatus to the support removal module.

Advantageously, this helps to reduce the burden placed on an operator by automatically moving the part between modules, and also helps to improve process throughput.

Optionally, the support removal module may comprise a cooling chamber, and a sensor configured to monitor a temperature of the cooling chamber.

The controller may receive feedback from the sensor and produce an output for adjusting a print procedure of an additive manufacturing apparatus based on the feedback received from the sensor.

Advantageously, this helps to reduce the system processing times, thereby further improving system throughput.

Optionally, the controller may modify a support removal process parameter of a support removal process, performed by the support removal module, based on the at least one part parameter determined by the inspection module.

Advantageously, this helps to improve the efficiency of support removal and helps to optimise the post-processing steps to improve system throughput.

Optionally, the controller may modify a processing parameter of a surface finishing process for processing a new part, based on the at least one part parameter determined by the inspection module.

Advantageously, this helps to efficiently ensure than any future parts manufactured by the system meet the required quality standards, without any further operator input being required.

Optionally, the inspection module may analyse the at least one part parameter after the surface of the part has been processed by the processing module.

The controller may modify the processing parameter of the surface finishing process, performed by the processing module, based on the at least one part parameter determined by the inspection module after the surface of the part has been processed by the processing module.

Alternatively, the controller may modify a processing parameter of the surface finishing process, performed by the processing module, based on the at least one part parameter determined by the inspection module after the surface of the part has been processed by the processing module.

Advantageously, this helps to improve the surface finish quality of parts processed using the system.

Furthermore, since the system automatically adjusts the surface finishing process parameters in response to a part falling below a desired surface finish quality, the amount of waste or "dud" parts produced using the system is also reduced.

Optionally, the method comprises, by the support removal module, removing unprocessed support powder surrounding the part.

Optionally, the method comprises, by the inspection module optically determining a surface texture and/or roughness of the part.

Optionally, the method comprises, by the processing module, smoothing a surface of the part responsive to the at least one part parameter associated with a surface finish of the part.

Optionally, the inspection module may determine the at least one part parameter associated with a surface finish of the part whilst the part is being transported on the at least one conveyor.

Advantageously, this removes the need for separate measuring and conveyance steps to be performed by the system, and hence overall throughput can be further improved.

According to a fourth aspect of the present invention there is provided a method of automatically processing an additively manufactured part comprising:

by a conveyor, locating an additively manufactured part in a support removal module configured to remove support material from an additively manufactured part;

by the support removal module removing support material from the part;

by a conveyor, moving the part from the support removal module to an inspect module for determining at least one part parameter associated with a surface finish of the part;

by the inspection module, determining at least one part parameter associated with a surface finish of the part;

by a conveyor, moving the part from the inspection module to a processing module for processing a surface of the part responsive to the at least one part parameter; and by the processing module, processing a surface of the part responsive to the at least one part parameter.

Advantageously, the system of the fourth aspect of the invention is able to provide a fully automated AM process, thereby improving system throughput.

Optionally, the method further comprises, by a controller, modifying a processing parameter of a surface finishing process, performed by a processing module, based on the at least one part parameter determined by the inspection module.

Advantageously, as with the first and second aspects of the present invention, since the system is able to automatically analyse and accordingly process AM parts, the overall burden placed on the system operator can be drastically reduced, and hence, product throughput can be drastically improved as a result.

Optionally, the method further comprises, by a conveyor, moving the part from an additive manufacturing apparatus to the support removal module.

Advantageously, this helps to reduce the burden placed on an operator by automatically moving the part between modules, and also helps to improve process throughput.

Optionally, the support removal module may comprise a cooling chamber, and a sensor configured to monitor a temperature of the cooling chamber.

The controller may receive feedback from the sensor and adjust a print procedure of an additive manufacturing apparatus based on the feedback received from the sensor.

Advantageously, this helps to reduce the system processing times, thereby further improving system throughput.

Optionally, the controller may modify a support removal process parameter of a support removal process, performed by the support removal module, based on the at least one part parameter determined by the inspection module.

Advantageously, this helps to improve the efficiency of support removal and helps to optimise the post-processing steps to improve system throughput.

Optionally, the controller may modify a processing parameter of a surface finishing process for processing a new part, based on the at least one part parameter determined by the inspection module.

Advantageously, this helps to efficiently ensure than any future parts manufactured by the system meet the required quality standards, without any further operator input being required.

Optionally, the inspection module may analyse the at least one part parameter after the surface of the part has been processed by the processing module.

The controller may modify the processing parameter of the surface finishing process, performed by the processing module, based on the at least one part parameter determined by the inspection module after the surface of the part has been processed by the processing module.

Alternatively, the controller may modify a processing parameter of the surface finishing process, performed by the processing module, based on the at least one part parameter determined by the inspection module after the surface of the part has been processed by the processing module.

Advantageously, this helps to improve the surface finish quality of parts processed using the system.

Furthermore, since the system automatically adjusts the surface finishing process parameters in response to a part falling below a desired surface finish quality, the amount of waste or "dud" parts produced using the system is also reduced.

Optionally, the method comprises, by the support removal module, removing unprocessed support powder surrounding the part.

Optionally, the method comprises, by the inspection module optically determining a surface texture and/or roughness of the part.

Optionally, the method comprises, by the processing module, smoothing a surface of the part responsive to the at least one part parameter associated with a surface finish of the part.

Optionally, the inspection module may determine the at least one part parameter associated with a surface finish of the part whilst the part is being transported on the at least one conveyor.

Advantageously, this removes the need for separate measuring and conveyance steps to be performed by the system, and hence overall throughput can be further improved.

According to a fifth aspect of the present invention there is provided a method of automatically processing an additively manufactured part, comprising:

providing an additively manufactured part;

by an inspection module, determining at least one part parameter associated with a surface finish of the part;

by a controller, modifying a processing parameter of a surface finishing process, performed by a processing module, based on the at least one part parameter determined by the inspection module; and by the processing module, processing a surface of the part responsive to the at least one part parameter.

Advantageously, as with the first, second and third aspects of the present invention, since the system is able to automatically analyse and accordingly process AM parts, the overall burden placed on the system operator can be drastically reduced, and hence, product throughput can be drastically improved as a result.

Optionally, the method may comprise, by the controller, modifying a support removal process parameter of a support removal process, performed by a support removal module, based on the at least one part parameter determined by the inspection module, and by the support removal module, removing support material from the part.

Advantageously, this reduces the amount of processing that is required at the processing module.

Optionally, the inspection module may be configured to analyse the at least one part parameter after the surface of the part has been processed by the processing module.

The controller may be configured to further modify the processing parameter of the surface finishing process, performed by the processing module, based on the at least one part parameter determined by the inspection module after the surface of the part has been processed by the processing module.

Alternatively, the controller may be configured to further modify a processing parameter of the surface finishing process, performed by the processing module, based on the at least one part parameter determined by the inspection module after the surface of the part has been processed by the processing module.

Advantageously, this helps to improve the surface finish quality of parts processed using the system.

Furthermore, since the system automatically adjusts the surface finishing process parameters in response to a part falling below a desired surface finish quality, the amount of waste or "dud" parts produced using the system is also reduced.

Optionally, the method may comprise, by an additive manufacturing apparatus, manufacturing a part.

Optionally, the method may comprise, by a cooling chamber, cooling the manufactured part, by a sensor, monitoring a temperature of the cooling chamber, and, by the controller, receiving feedback from the sensor and producing an output for adjusting a print procedure of an additive manufacturing apparatus based on the feedback received from the sensor.

Advantageously, this helps to reduce cooling times, and hence system processing times, thereby further improving system throughput.

Optionally, the method comprises, by a conveyor, moving the part from an additive manufacturing apparatus to the support removal module.

Optionally, the method comprises, by the support removal module, removing unprocessed support powder surrounding the part.

Optionally, the method comprises, by the inspection module optically determining a surface texture and/or roughness of the part.

Optionally, the method comprises, by the processing module, smoothing a surface of the part responsive to the at least one part parameter associated with a surface finish of the part.

Optionally, the method may comprise, by a controller, modifying a processing parameter of a surface finishing process for processing a new part, based on the at least one part parameter determined by the inspection module.

Advantageously, this helps to efficiently ensure than any future parts manufactured by the system meet the required quality standards, without any further operator input being required.

DESCRIPTION OF THE DRAWINGS

Certain embodiments of the present invention will now be described with reference to the accompanying drawings in which.

DETAILED DESCRIPTION

Figure 1:
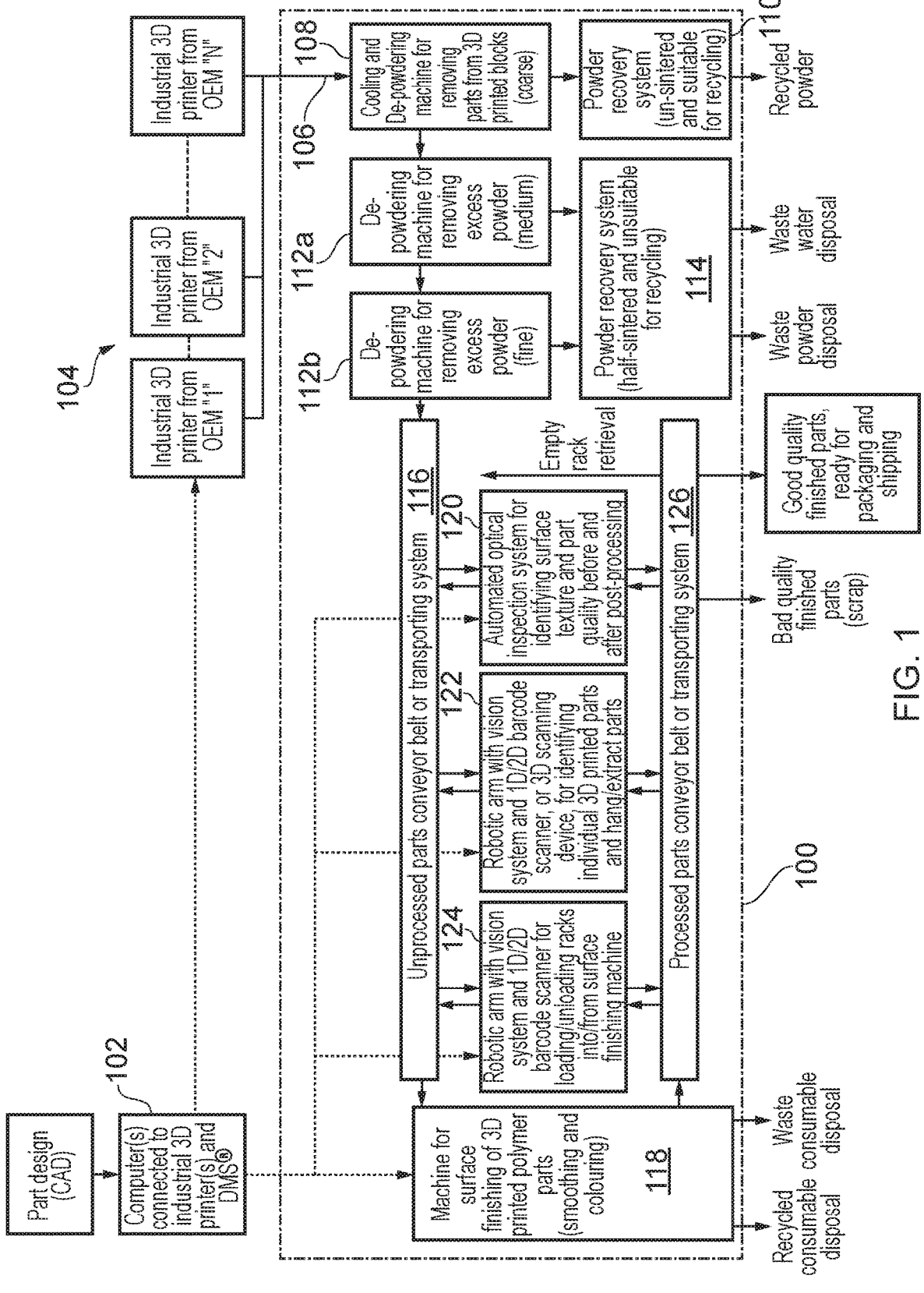
FIG. 1 illustrates a digital manufacturing system according to certain embodiments of the present invention.

As illustrated in FIG. 1, a digital manufacturing system 100 includes a controller 102, e.g. a computer, connected by wire or wirelessly to one or more 3D printers 104 for additively manufacturing at least one AM part. The controller 102 is configured to receive data, for example CAD data, relating to the 3D part/s to be printed. The data, e.g. an STL file including part requirements (e.g. dimensional tolerances, geometrical tolerances, surface texture, surface roughness, and colour), is sent to the 3D printer/s via suitable 3D printer software. The 3D printer/s 104 may be the same or a combination of different AM printers from the same or different manufacturers each suitable for printing a 3D part using an AM technique, including Selective Laser Sintering (SLS), Multi Jet Fusion (MJF), High Speed Sintering (HSS), Fused Filament Fabrication or Fused Deposition Modelling (FFF/FDM) or Stereolithography (SLA), or the like.

A robotic system 106 is configured to retrieve one or more 3D printed powder blocks, including one or more AM parts therein, from at least one of the printers 104 and transport them to a support removal module 108.

The support removal module 108 includes a cooling chamber to cool down an as-printed powder cake of AM parts to a temperature suitable for de-powdering. The cooling chamber is aptly configured to control the temperature of the cooling chamber surfaces and interior, and aptly includes at least one thermocouple to monitor the ambient temperature within the cooling chamber.

A pump may be provided to flood the cooling chamber with an inert gas and a vacuum pump may be provided to remove the inert gas from the cooling chamber.

At least one heat exchanger may be provided to control the temperature of the cooling chamber.

The as-printed cake including one or more AM parts may be located in the cooling chamber by a robotic actuator of the robotic system 106, e.g. transported automatically and in a controlled manner from a printing/processing chamber of one of the 3D printers 104 to the cooling chamber.

The support removal module 108 is configured to remove unprocessed powder surrounding the AM part. The module may include a de-powdering chamber which is separate to the cooling chamber or the cooling chamber may be configured to be a de-powdering chamber. The de-powdering chamber may aptly include a fluidising bed reactor to remove the powder from the AM part by fluidising loose powder and separating it from the solid AM part. The fluidising bed reactor comprises a gas inlet, distributor, and gas outlet.

Alternatively, the de-powdering chamber may comprise a sieve shaker with an ultrasonic vibrating device to vigorously agitate the AM part/s and remove the bulk of un-sintered powder therefrom. The sieve may comprise a stainless-steel mesh with a pore size larger than the diameter of the polymer powder particles, and the vibrating device may comprise an array of ultrasonic transducers. The removed un-sintered powder may be collected beneath the fluidisation chamber or sieve shaker in a powder collection chamber of a powder recovery module 110.

Optionally, the AM part/s may be automatically transferred by the or a further robotic system to one or more additional de-powdering chambers 112a,112b for further de-powdering, e.g. medium and fine grade de-powdering and/or half-sintered powder which is unsuitable for recycling. The additional de-powdering chamber/s 112 may also include a sieve shaker and ultrasonic vibrating device or may include other suitable de-powdering means such as a de-powdering module configured to impart ultrasonic waves in a water-surfactant solution, such as described in GB1808639.7 by Additive Manufacturing Technologies Limited. The recovered powder can be disposed via the same powder recovery module 110 or a different powder recovery module/s 114.

The system 100 includes at least one first conveyor 116, e.g. belt, for transporting 'unprocessed' AM parts from the de-powdering modules 108,112a, 112b towards a surface finishing module/apparatus 118.

An optical inspection module 120 is also provided to identify a surface texture of each AM part on the first conveyor 116, corresponding to a surface finish quality of the part before post-processing. The inspection module 120 is also configured to provide data relating to the surface finish quality of the part to the controller 102. The controller 102 is configured to then operate the surface finishing module/apparatus 118 accordingly to achieve a desired surface texture. A suitable inspection module 120 is described in GB1806168.9 by Additive Manufacturing Technologies Limited.

In other embodiments, the controller 102 may be configured to modify parameters of the de-powdering process, performed by the de-powdering module 108, based on the surface texture identified by the optical inspection module 120. This helps to remove the supports of the part in a more efficient way to ensure as much of the support as possible is removed. Also it helps to reduce the amount of surface processing that is required by the surface finishing module 118, thereby helping to further improve product throughput.

The system 100 includes at least one first robotic arm 122 with object recognition/vision capability for automatically identifying an AM part/s on the first conveyor 116 and locating/retrieving the same onto/from a rack/hanger of the surface finishing module/apparatus 118. At least one further robotic arm 124 may be provided with object recognition/vision capability for automatically locating/retrieving each rack/hanger into/from the surface finishing module/apparatus 118. Aptly, the first and further robotic arms 122,124 may be provided by the same unit.

The surface finishing module/apparatus 118 is aptly configured to automatically smooth an AM polymer part to a desired surface roughness by using a solvent-based method, such as described in GB1721485.9 by Additive Manufacturing Technologies Limited. The surface finishing module/apparatus 118 is also aptly configured to automatically colour an AM polymer part using a suitable colouring method, such as described in GB1812476.8 by Additive Manufacturing Technologies Limited.

Once the AM part/s has been processed as desired, it is removed from the surface finishing module/apparatus 118 by the robotic arm/s 122,124 and placed on a second conveyor 126, e.g. belt.

The optical inspection module 120 is configured to re-identify the surface texture of the AM part, after it has been processed by the surface finishing module 118, to determine the surface finish quality of the processed AM part/s. If the AM part fails to meet a desired surface finish quality, the part is reprocessed or discarded as required. The empty racks are retrieved from the second conveyor. Post-processed AM parts which meet the desired surface finish quality (i.e. a desired smoothness and/or colour) are removed from the second conveyor by the robotic arm/s for packaging and shipping.

The optical inspection module 120 is configured to feed back the surface finish quality of the identified post-processed part to the controller 102. In turn, the controller 102 is configured to adjust parameters of the surface finishing process, performed by the surface finishing module 118, accordingly to help ensure that any further parts being manufactured and post-processed by the system achieve the desired surface finish quality.

The individual processes and modules of the system 100 are linked and selectively controlled by a software application executed by the controller 102 which automatically manages the AM process and links the system 100 to the 3D printers and the initial CAD stage.

Figure 2:
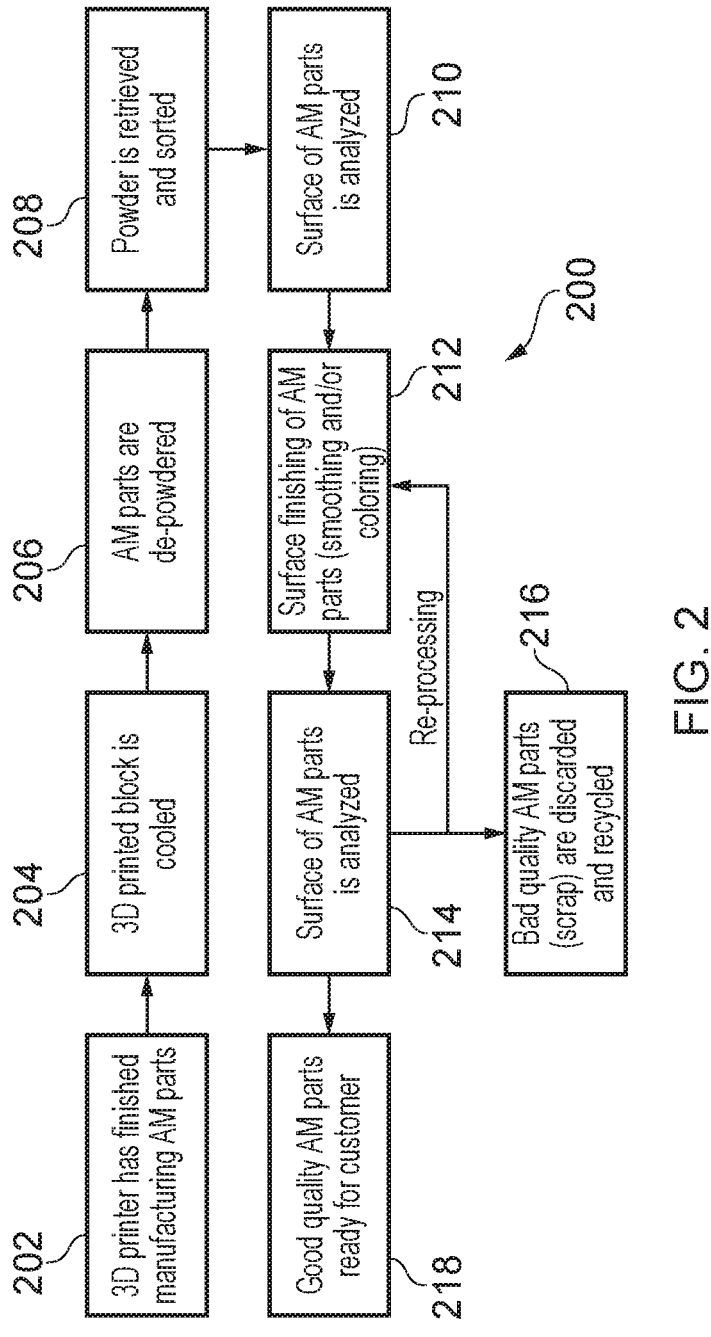
FIG. 2 illustrates a digital manufacturing method according to certain embodiments of the present invention.

A digital manufacturing method 200 according to certain embodiments of the present invention will now be described with reference to FIG. 2.

At step 202, a powder cake/block containing one or more AM parts has been manufactured using one of the 3D printers 104.

At step 204, the AM block is transferred by the robotic system 106, e.g. a robotic arm, to the cooling and de-powdering module 106 and cooled to a desired temperature for de-powdering. Once the AM block is cooled to around 100° C. or less, it is transferred to the de-powdering module 108 by the robotic system 106.

To decrease the cooling time, the controller 102 is configured to the adjust the print procedures of the 3D printers 104 based on the temperature of the cooling chamber to allow for more rapid cooling of the chamber and hence improved processing times.

At step 206, the AM block is broken down and the AM parts within the block are de-powdered by the de-powdering module/s. In case of non-powder-based parts like FDM/ SLA, a support removing module may be provided for respective support removal of FDM or SLA parts, and optionally curing of SLA parts. The support removing module may in addition to or as an alternative to the de-powdering module.

At step 208, the powder from the AM parts is recovered using the powder recovery module/s 110,114. The recovered powder is aptly sorted into un-sintered re-usable powder and non-reusable waste powder. In the meantime, the de-powdered AM parts are transferred onto the first conveyor 116.

At step 210, while on the first conveyor 116, the surface of the de-powdered AM part/s is analysed using the non-contact optical inspection module 120. The inspection module 120 analyses the surface texture, colour, and part geometry and sends the information to the controller 102 which in turn sends appropriate parameters to the surface finishing module 118.

In other embodiments, the controller 102 may further modify parameters of the de-powdering process, performed by the de-powdering module 108, based on the analysis of the non-contact optical inspection module 120. This helps to improve the quality of support removing and reduce the amount of post-processing that is required at the surface finishing module 118.

The AM parts are then transferred further along the first conveyor 116 towards the first robotic arm 122 which identifies the parts and hangs them onto a rack/hanger/frame support for loading into the surface finishing module 118.

At step 212, the AM parts undergo the desired surface processing, including smoothing and/or colouring before being removed from the surface finishing module 118 by the second robotic arm 124 and placed on the second conveyor 126. The processed AM parts are removed from the rack/ hanger by the first robotic arm 122.

At step 214, the surface of the processed AM parts is re-analysed by the non-contact optical inspection module 120. The inspection module 120 feeds back the determined surface quality to the controller 102. Any AM parts that do not meet a predetermined quality criteria and which can no longer be improved via re-processing are discarded for recycling. The controller 102 then adjusts parameters of the surface finishing process, performed by the surface finishing module 118, based upon the inspection module 120 feedback so that any future parts processed by the system are able to meet the desired surface quality criteria.

This helps to ensure that any further parts processed using the system meet the predetermined quality criteria, which helps to reduce the amount of "dud" parts processed via the system.

At step 218, the finished and acceptable AM parts are manually or robotically removed from the second conveyor to be packaged/shipped.

The afore-described system and method are therefore able to digitally post-process and handling unique 3D printed components, without requiring burdensome operator input for the processing of each part, thereby removing the operator from the process.

Furthermore, by using an iterative feedback approach, the system can generate special sets of parameters for each unique 3D printed part for each post-processing step, without any need of human supervision, to help efficiently ensure that any future parts manufactured using the system meet desired surface quality criteria.

Certain embodiments of the present invention therefore provide a system and method for fully automating the AM process from initial part design to inspection of a post-processed AM part. The present invention provides a flexible and customisable modular end-to-end automated post-processing manufacturing system and method for fully automating the AM process which can be used for many different consumer and industrial applications.

In exemplary embodiments, the support removal process and processing step may be performed as a single step e.g. by the system including a single processing module for processing a surface of the part responsive to the at least one part parameter and a controller configured to modify a processing parameter of a surface finishing process, performed by the processing module, based on the at least one part parameter determined by the inspection module.

The invention claimed is:

1. A method of automatically processing an additively manufactured part, comprising:

providing the additively manufactured part;

by a robotic system, transferring the additively manufactured part to a de-powdering module configured to remove unprocessed support powder surrounding the additively manufactured part;

by the de-powdering module, removing unprocessed support powder surrounding the additively manufactured part;

by a conveyer, moving the part from the de-powdering module to an inspection module for determining at least one part parameter associated with a surface finish of the part;

by the inspection module, analysing a surface of the de-powdered additively manufactured part to determine at least one part parameter associated with a surface finish of the additively manufactured part, wherein said at least one part parameter is selected from the group consisting of a surface texture of the additively manufactured part, a surface colour of the additively manufactured part, and a combination thereof, and sending information relating to the surface texture and surface colour of the de-powdered additively manufactured part to a controller;

by the conveyor, moving the additively manufactured part from the inspection module to a processing module configured to process a surface of the additively manufactured part responsive to the at least one part parameter;

by the controller, modifying a processing parameter of the surface finishing process to be performed on the additively manufactured part by the processing module based on the information relating to the surface texture and surface colour of the de-powdered additively manufactured part sent to the controller by the inspection module, and sending said modified processing parameter to the processing module; and by the processing module, smoothing, colouring, or both, a surface of the de-powdered additively manufactured part based on the modified processing parameter sent to the processing module by the controller.

2. The method according to claim 1, further comprising the step of:

by the controller, modifying a support powder removal process parameter of the support powder removal process, performed by the de-powdering-module, based on the at least one part parameter determined by the inspection module.

3. The method according to claim 2, further comprising the step of, by a powder recovery module, recovering the unprocessed support powder removed from the additively manufactured part by the de-powdering module.

4. The method according to claim 3, wherein the recovered unprocessed support powder comprises un-sintered re-usable powder and non-reuseable waste powder, and wherein the method further comprises the step of sorting the un-sintered re-useable waste powder from the non-reuseable waste power.

5. The method according to claim 1, further comprising the steps of:

by the inspection module, determining the at least one part parameter associated with a surface finish of the additively manufactured part after the surface of the additively manufactured part has been processed by the processing module; and by the controller, modifying the processing parameter of the surface finishing process, performed by the processing module, based on the at least one part parameter determined by the inspection module after the surface of the additively manufactured part has been processed by the processing module.

6. The method according to claim 1, further comprising the steps of:

by a cooling chamber, cooling the additively manufactured part;

by a sensor, monitoring a temperature of the cooling chamber; and by the controller, receiving feedback from the sensor and producing an output for adjusting a print procedure of an additive manufacturing apparatus based on the feedback received from the sensor.

7. The method according to claim 1, comprising, by the inspection module, optically determining the surface texture of the additively manufactured part.

8. The method according to claim 1, comprising, by the processing module, smoothing a surface of the additively manufactured part responsive to the at least one part parameter associated with a surface finish of the additively manufactured part.

9. The method according to claim 1, comprising, by the controller, modifying a processing parameter of a surface finishing process for processing a new part, based on the at least one part parameter determined by the inspection module.

10. A method of automatically processing an additively manufactured part, comprising:

providing an additively manufactured part;

by a robotic system, transferring the additively manufactured part to a de-powdering module configured to remove unprocessed support powder surrounding the additively manufactured part;

by the de-powdering module, removing unprocessed support powder surrounding the additively manufactured part;

by a conveyor, moving the part from the de-powdering module to an inspection module for determining at least one part parameter associated with a surface finish of the part;

by the inspection module, analysing a surface of the de-powdered additively manufactured part to determine at least one part parameter associated with a surface finish of the part, wherein the at least one part parameter is a surface texture and/or roughness of the additively manufactured part, and sending information relating to the surface texture and/or roughness of the de-powdered additively manufactured part to a controller;

by the conveyor, moving the additively manufactured part from the inspection module to a processing module configured to process a surface of the additively manufactured part responsive to the at least one part parameter;

by the controller, modifying a processing parameter of a surface finishing process to be performed on the additively manufactured part by the processing module based on the information relating to the surface texture and/or roughness of the de-powdered additively manufactured part sent to the controller by the inspection module, and sending said modified processing parameter to the processing module; and by the processing module, smoothing a surface of the de-powdered additively manufactured part based on the modified processing parameter sent to the processing module by the controller so as to achieve a desired smoothness.

11. The method according to claim 10, wherein the surface finishing process performed by the processing module is a solvent-based smoothing process.

12. The method according to claim 10, further comprising the steps of:

by the inspection module, determining the surface texture and/or roughness associated with a surface finish of the additively manufactured part after the surface of the additively manufactured part has been smoothed by the processing module; and by the controller, modifying the processing parameter of the surface finishing process, performed by the processing module, based on the surface texture and/or roughness determined by the inspection module after the surface of the additively manufactured part has been processed by the processing module.

13. The method according to claim 10, comprising, by the controller, modifying a processing parameter of a surface finishing process for smoothing a new additively manufactured part, based on the surface texture and/or roughness determined by the inspection module.

* * * * *